United States Patent
Bouillet et al.

(10) Patent No.: US 7,165,115 B2
(45) Date of Patent: Jan. 16, 2007

(54) METHOD FOR CONTROLLING THE DISPOSITION OF AN INCOMING CALL BASED ON THE LOADING STATUS OF A ROUTE AND ON A TEST OF EACH LINK ALONG THE ROUTE

(75) Inventors: Eric Bouillet, Hoboken, NJ (US); Debasis Mitra, Summit, NJ (US); Kajamalai Gopalaswamy Ramakrishnan, Berkeley Heights, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 596 days.

(21) Appl. No.: 10/213,480

(22) Filed: Aug. 7, 2002

(65) Prior Publication Data
US 2003/0101263 A1    May 29, 2003

Related U.S. Application Data

(62) Division of application No. 09/441,693, filed on Nov. 16, 1999, now Pat. No. 6,954,739.

(51) Int. Cl.
*G06F 15/173* (2006.01)

(52) U.S. Cl. .............. 709/232; 709/224; 709/225; 709/239; 709/241; 379/220.01; 370/231; 370/238; 370/248

(58) Field of Classification Search .............. 709/225, 709/227, 238–241, 224, 232; 370/230, 231, 370/235, 236, 238, 252, 248; 379/220.01
See application file for complete search history.

(56) References Cited

U.S. PATENT DOCUMENTS

| | | | |
|---|---|---|---|
| 5,521,971 A * | 5/1996 | Key et al. .............. | 379/221.07 |
| 5,854,903 A | 12/1998 | Mitra et al. .............. | 395/200.79 |
| 6,084,955 A * | 7/2000 | Key et al. .............. | 379/220.01 |
| 6,331,986 B1 | 12/2001 | Mitra et al. .............. | 370/468 |
| 6,496,480 B1 * | 12/2002 | Ash et al. .............. | 370/238.1 |
| 6,560,204 B1 * | 5/2003 | Rayes .............. | 370/253 |
| 6,590,867 B1 * | 7/2003 | Ash et al. .............. | 370/236 |
| 6,643,464 B1 * | 11/2003 | Roorda et al. .............. | 398/59 |
| 6,657,965 B1 * | 12/2003 | Shaffer et al. .............. | 370/238 |
| 6,765,868 B1 * | 7/2004 | Dunn et al. .............. | 370/230 |
| 6,775,701 B1 * | 8/2004 | Pan et al. .............. | 709/226 |

OTHER PUBLICATIONS

Jamin et al., "A Measurement-Based Adminission Control Algorithm for Integrated Service Packet Networks", IEEE/ACM Transactions on Networking, vol. 5, No. 1, Feb. 1997.*

(Continued)

*Primary Examiner*—Saleh Najjah
*Assistant Examiner*—Oanh Duong
(74) *Attorney, Agent, or Firm*—Martin I. Finston

(57) ABSTRACT

Disclosed are network management procedures that apply measurements of traffic load to achieve greater efficiency in the operation of the network. In a method for deciding whether to route an incoming call on a selected potential service route, the potential service route is treated preferentially if each of its links has available capacity that is more than sufficient by a specified margin. In a method for computing billing revenues, the non-compliance of the network service provider with contracted requirements for carried load causes a revenue penalty to be exacted for lost bandwidth.

1 Claim, 5 Drawing Sheets

OTHER PUBLICATIONS

U.S. Appl. No. 09/370,826, filed Aug. 9, 1999, Mitra et al.

Gibbens, R.J. et al., "Dynamic Alternative Routing—Modeling and Behavior," Proc. 12$^{th}$ Int. Teletraffic Congress, Torino, Italy, pp. 1019-1025, 1998.

Mitra, D. et al. "ATM Network Design and Optimization: A Multirate Loss Network Framework," IEEE/ACM Trans. Networking vol. 4, No. 4, 1996.

* cited by examiner

| STATUS$^{(v)}_\sigma(n)$ 195 | | | |
|---|---|---|---|
| STATUS$^{(v)}_{sr}(n)$ 190 | US | $y_l(t) + d_s \leq C_l$  A | $y_l(t) + d_s \leq C_l - R^{(v)}_2 \hat{d}$  C |
| | OS | $y_l(t) + d_s \leq C_l - R_1 \hat{d}$  B | $y_l(t) + d_s \leq C_l - (R_1 + R^{(v)}_2)\hat{d}$  D |

METHOD FOR CONTROLLING THE DISPOSITION OF AN INCOMING CALL BASED ON THE LOADING STATUS OF A ROUTE AND ON A TEST OF EACH LINK ALONG THE ROUTE

This a divisional of application Ser. No. 09/441,693 filed on Nov. 16, 1999 now U.S. Pat. No. 6,954,739.

FIELD OF THE INVENTION

The invention relates to methods of admission control, routing, and billing computation in packet networks. More particularly, the invention relates to the use of such methods in operating networks that support multiple levels of service.

ART BACKGROUND

A Service-Level Agreement (SLA) is a contract between the provider of packet network services and one of its customers (i.e., subscribers) that specifies some minimum quality of service that must be met or exceeded in the handling of calls identified with an application or service. One measure of performance that an SLA may specify is the amount of bandwidth that must be available on demand. A Virtual Private Network (VPN) is defined when the SLA specifies the amount of bandwidth that is to be made available, on demand, in each of a set of streams identified with the customer. A "stream" in this context is σ node pair a of the network consisting of a source node and a destination node with respect to calls, in association with a particular class of service s. The various possible service classes may include, e.g., voice, data, e-mail, file tranfers, web browsing, and video. A packet network is, for example, a network supporting the ATM, IP, or Frame Relay protocol.

We will use the term "call" to denote any communicative transaction, or distinct subdivision of a communicative transaction, commonly referred to as a call, connection, or flow.

In the operation of a packet network, incoming calls identified with various customers must compete for the same network resources, such as link bandwidth capacity. Additionally, there is contention for the same resources by calls of different service classes, whether belonging to the same customer or to different customers. In such an environment, it is difficult to consistently provide each customer with the service quality it demands in each class of service, while also profitably operating the network.

One approach to this problem is to design the bandwidth loads $X_{sr}$ of the network to accommodate the expected traffic patterns in an optimal way. Here, the design load $X_{sr}$ is the designed bandwidth to be carried on a service route (s, r), i.e., on a route r between a given source-destination pair in a given service class s. A design method that explicitly recognizes the statistical properties of communication traffic is described, e.g., in U.S. Pat. No. 5,854,903 issued to D. Mitra et al. on Dec. 29, 1998 under the title "Optimization Method for Routing and Logical Network Design in Multi-Service Networks" and commonly assigned herewith. An extension of that exemplary design method to virtual private networks is described in the co-pending U.S. patent application Ser. No. 09/065,506, filed on Apr. 24, 1998 by D. Mitra et al. under the title "Method for Resource Allocation and Routing in Multi-Service Virtual Private Networks" and commonly assigned herewith. A design method based on concepts relating to multicommodity flow is described in U.S. patent application Ser. No. 09/370,826, filed on Aug. 9, 1999 by D. Mitra et al. under the title "Multicommodity Flow Method For Designing Traffic Distribution On A Multiple-Service Packetized Network" and commonly assigned herewith.

Although such off-line methods of network design are useful, they do not, by themselves, provide the ability to respond to traffic behavior in real time. However, because of the randomly fluctuating nature of traffic, there are often potential gains in total carried traffic or total revenue that could be realized if routing decisions could be informed by real-time measurements.

SUMMARY OF THE INVENTION

We have developed procedures for network management that apply measurements of traffic load (i.e., of traffic bandwidth) in order to achieve greater efficiency in the operation of the network.

In one aspect, our invention involves a method for deciding whether to route an incoming call on a selected potential service route. According to our method, the potential service route is classified as oversubscribed or undersubscribed, depending on how its measured load compares with its design load. A potential service route that is oversubscribed will be deemed to have sufficient available bandwidth capacity to carry the incoming call only if each of its links has available capacity that is more than sufficient by a margin referred to here as the bandwidth reservation.

In another aspect, our invention involves a method for computing billing revenues, in which incremental revenues for a given stream depend on whether the network service provider is deemed compliant with an SLA with respect to the given stream. According to one embodiment, the service provider, to be deemed compliant, must carry at least a contracted fraction of offered load (i.e., of offered stream bandwidth) when the offered load lies within a contracted limit, but need only carry a specified load when the offered load exceeds the contracted limit. A revenue penalty is exacted for offered stream bandwidth that is lost while the service provider is non-compliant.

In yet another aspect, our invention involves performing all of the following steps at the ingress node for an incoming call destined for a given stream: determining whether each of at least some potential service routes for the incoming call is oversubscribed or undersubscribed; from measurements of offered and carried load, determining whether the network is compliant with a condition, e.g., the SLA condition described above; routing the incoming call according to a procedure that preferentially selects undersubscribed service routes; and accruing a positive revenue increment in at least one time window for carried load due to the routed call.

DETAILED DESCRIPTION

Figure 1:
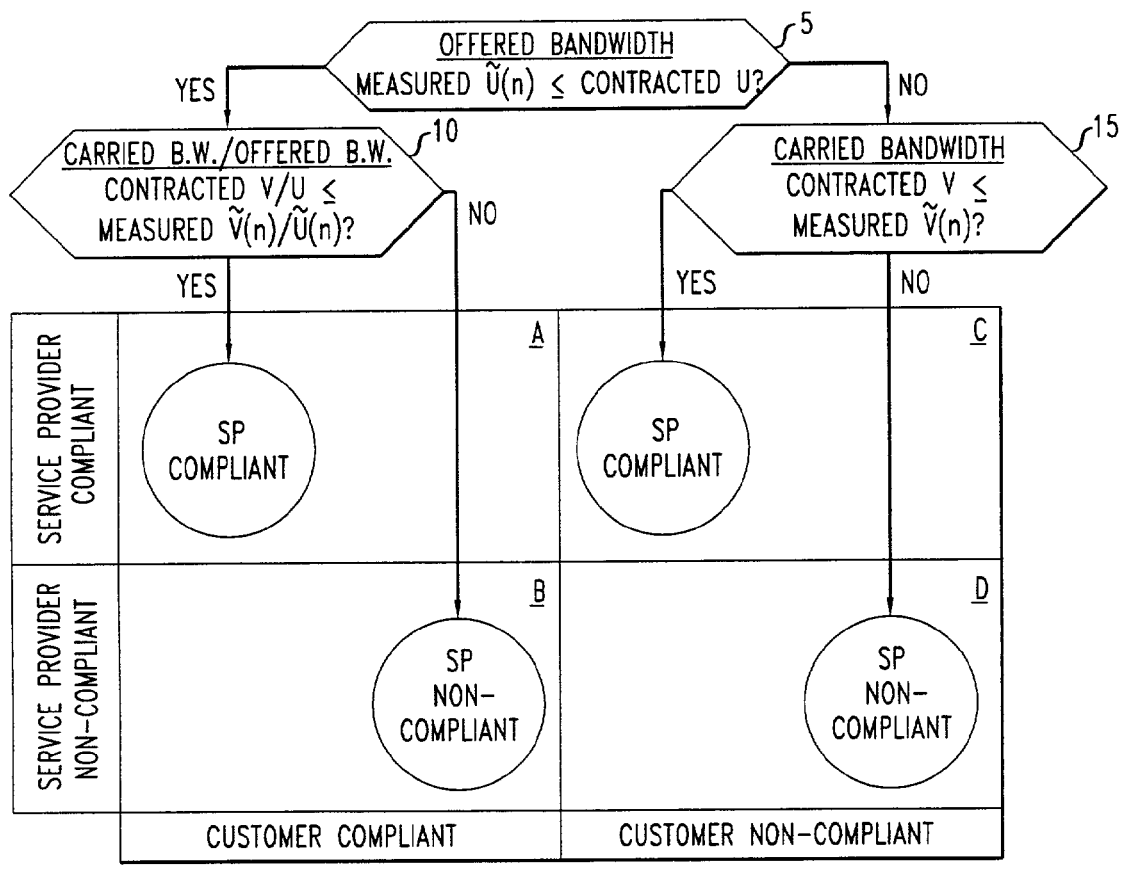
FIG. 1 is an annotated flowchart which illustrates compliance decisions in accordance with an illustrative type of SLA. As illustrated, four outcomes are possible, depending on: (i) whether or not the customer complies with contracted limits on offered load in a given stream, and (ii) whether or not the service provider (the "SP" as indicated in the figure) carries a contracted amount of the offered load.

An exemplary SLA pertinent to the practice of the invention stipulates, for each stream (s,σ), an aggregate offered bandwidth $U_{so}$ (the "contracted offered bandwidth") and an aggregate carried bandwidth $V_{so}$ (the "contracted carried bandwidth"), $V_{so} < U_{so}$. Implicitly, the ratio $V_{so}/U_{so}$ is the contracted flow-acceptance ratio for the stream. It should be noted that this ratio cannot be precisely unity, because due to the statistical nature of the incoming traffic, only a network having infinite capacity could guarantee that 100% of incoming calls will be accepted.

For determining whether there is compliance with the terms of the SLA, estimates of the actual offered and carried bandwidths are made, based on measurements. Bandwidth can be measured directly by examining the offered and carried packets. Alternatively, calls can be counted and the total bandwidth inferred from effective bandwidths associated with each of the calls. (Effective bandwidth is described in more detail below.) In either case, it is advantageous for the bandwidth measurements to be performed at the ingress node, i.e., at the source node of the corresponding stream.

Initially, we will describe an SLA monitoring scheme based on call-level accounting. Later, we will discuss an example of SLA monitoring based on packet-level (i.e., on data-level) accounting. The numerical studies that we describe below used call-level accounting.

An exemplary measurement procedure employs time windows, referred to here as "SLA windows," and it also employs exponential smoothing. The SLA window length τ and the smoothing parameter $\alpha_{SLA}$ are also advantageously stipulated in the SLA.

Let $\tilde{V}_{so}(n)$ denote a measured value of carried stream bandwidth in time window n, and let $\tilde{U}_{so}(n)$ denote a measured value of offered stream bandwidth in the same time window. Because each measurement involves some degree of estimation, we refer to these values as "estimated" bandwidth values in the following discussion.

In the following discussion, it will be optional whether smoothed or unsmoothed values of $\tilde{V}_{so}(n)$ and $\tilde{U}_{so}(n)$ are used. (Smoothed values were used in the numerical studies described below.) However, to illustrate one form of smoothing that is useful in this context, we here let $\tilde{V}_{so}^{SM}(n)$ and $\tilde{U}_{so}^{SM}(n)$ represent smoothed values, and we let $\tilde{V}_{so}^{RAW}(n)$ and $\tilde{U}_{so}^{RAW}(n)$ represent corresponding raw, i.e., unsmoothed, values. Then according to an illustrative smoothing technique, $$\tilde{V}_{so}^{SM}(n+1) = \alpha_{SLA}\tilde{V}_{so}^{SM}(n) + (1-\alpha_{SLA})\tilde{V}_{so}^{RAW}(n), \text{ and}$$

$$\tilde{U}_{so}^{SM}(n+1) = \alpha_{SLA}\tilde{U}_{so}^{SM}(n) + (1-\alpha_{SLA})\tilde{U}_{so}^{RAW}(n).$$

According to an exemplary SLA, a compliant customer is one whose offered stream bandwidth does not exceed the contracted amount. The service provider promises to carry the same fraction of the estimated offered bandwidth as the proportion of contracted carried to contracted offered bandwidth. If the service provider carries a smaller fraction than what is promised, it is declared non-compliant and pays a penalty for each call that is lost (i.e., not carried) while the service provider is in the non-compliant state.

On the other hand, the customer is non-compliant if it offers more stream bandwidth than the contracted amount. In that event, the service provider promises to carry only the contracted amount of carried bandwidth. The service provider is declared non-compliant if it fails to carry the contracted amount. In that case it pays a penalty for lost calls, e.g. for lost bandwidth up to the contracted amount.

Advantageously, the monitoring of customer and service-provider compliance, and the declaration of corresponding compliant and non-compliant states, take place at the ingress node.

FIG. 1 illustrates an exemplary decision process for SLA compliance. At block 5, the estimated value $\tilde{U}_{so}(n)$ of the offered stream bandwidth is compared with the contracted value $U_{so}$. The estimated value of the offered bandwidth (and as will be seen below, also the estimated value of the carried bandwidth) is determined at the end of the n'th SLA window. However the variable "SLA_state", which takes the value "compliant" if the service provider is SLA-compliant and the value "non-compliant" otherwise, is treated as uniform over the entire window. (More generally, the pair of variables describing the respective states of SLA compliance of the customer and the service provider are treated as uniform over the entire window.) We found that this approximation is helpful for controlling the processing burden, and that it permits averaging and tends to increase accuracy.

The output of block 5 is "yes" if the estimated value of offered bandwidth is no greater than the contracted value. In that case, the customer is SLA compliant, as represented by the left-hand side of the grid at the bottom of the figure, i.e., quadrants A and B. If the output of block 5 is "no", the customer is SLA non-compliant, as represented by quadrants C and D.

The test of whether the service provider is SLA-compliant (which, in turn, determines the value of the variable SLA_state) takes different forms, depending on the result of block 5. In the case of a compliant customer, the test of block 10 applies. In block 10, ratios are compared of carried bandwidth to offered bandwidth. If the ratio $V_{so}/U_{so}$ of contracted values is no greater than the ratio $\tilde{V}_{so}(n)/\tilde{U}_{so}(n)$ of estimated values, the service provider is declared SLA-compliant for window n, as indicated in quadrant A of the figure. Otherwise, the service provider is declared SLA non-compliant, as indicated in quadrant B.

In the case of a non-compliant customer, the test of block 15 applies. According to the test of block 15, the service provider is declared SLA-compliant for window n if the contracted amount $V_{so}$ of carried bandwidth is no greater than the estimated amount $\tilde{V}_{so}(n)$, as indicated in quadrant C of the figure. Otherwise, the service provider is declared non-compliant, as indicated in quadrant D.

Figure 2:
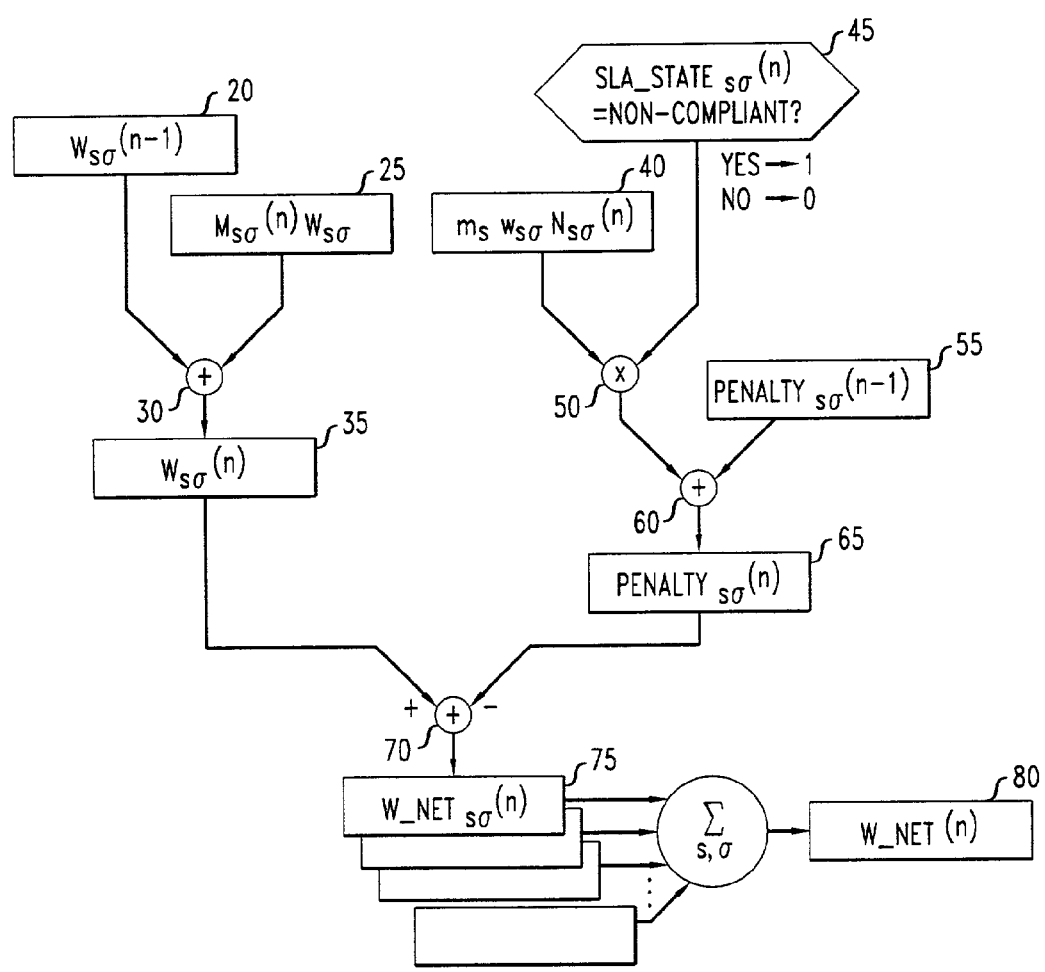
FIG. 2 is a flowchart illustrating incremental stream revenue calculations in accordance with an illustrative embodiment of the invention, in one aspect. At the final summing point near the bottom of the figure, a positive revenue increment for carried load and a negative penalty increment for lost load are combined to form a net stream revenue increment.

Every call that is carried generates revenue to the service provider and increments a flow revenue measure $W_{s\sigma}(n)$. For example, as shown in FIG. 2, a previous cumulative revenue measure $W_{s\sigma}(n-1)$ (shown in block 20 of the figure) is incremented at summing point 30 by the current amount shown in block 25 to form the current cumulative revenue measure $W_{s\sigma}(n)$ for SLA window n (block 35). The current increment of block 25 is the product of the number $M_{s\sigma}(n)$ of calls of stream $(s,\sigma)$ carried in window n, and a stream revenue parameter $w_{s\sigma}$. By way of example, but not of limitation, we note that in numerical studies we set $w_{s\sigma}$ equal to the product of the effective bandwidth $d_s$ and the mean holding time $h_s$ of calls of service class s. The effective bandwidth can be adjusted to account, in a single parameter, for various packet-level factors such as burstiness, delay, jitter, and loss at network elements.

If the service provider loses calls while in a state of SLA non-compliance, it may be liable to pay a penalty. In the exemplary scheme of FIG. 2, a previous value penalty$_{s\sigma}(n-1)$ of a cumulative flow penalty measure (block 55) is incremented at summing point 60 by the current penalty increment to form a current value penalty$_{s\sigma}(n)$ of the cumulative measure for window n (block 65). The current penalty increment is the value shown at block 40 of the figure. However, at multiplier 50, the current penalty increment is given a multiplicative weight of 0 (in which case it is not added to the cumulative value in block 65) if the service provider is SLA-compliant in window n. Otherwise, the penalty increment receives a multiplicative weight of 1.

As shown at block 40, the penalty increment is exemplarily the product of three factors: the stream revenue parameter $w_{s\sigma}$, the number $N_{s\sigma}(n)$ of calls of stream $(s,\sigma)$ that are lost in SLA window n, and an adjustable penalty multiplier $m_{s\sigma}$, which is typically greater than 1.

Various alternative penalty structures are also readily implemented. For example, the penalty structure of FIG. 2 penalizes the service provider for all calls that are lost while the SLA state of the network lies in quadrant D of FIG. 1, even when the amount of offered bandwidth is grossly in excess of that stipulated in the SLA. To discourage gross excesses of offered traffic, it will in some cases be advantageous to limit the factor $N_{s\sigma}(n)$ in block 40 of FIG. 2 so that it includes only the difference between the measured (i.e., estimated) and contracted values of carried bandwidth.

At summing point 70, the cumulative stream revenue value of block 35 and the cumulative stream penalty value of block 65 are combined as respective positive and negative contributions to the net stream revenue $W\_net_{s\sigma}(n)$, as shown at block 75. Summing $W\_net_{s\sigma}(n)$ over all streams gives a network-wide measure $W\_net(n)$ of cumulative net revenue, as shown in block 80.

In the preceding discussion, we have treated it as optional whether smoothed or unsmoothed values are used for $\tilde{V}_{s\sigma}(n)$ and $\tilde{U}_{s\sigma}(n)$. According to our current belief, however, it will be especially advantageous to base the SLA state determination on smoothed values, but to compute the revenue and penalty values based on the unsmoothed measurements of bandwidth offered and carried in each time window.

As mentioned above, an alternative to call-level monitoring is to measure the offered and carried bandwidth at the packet (or data) level. Leaky bucket techniques, for example, are readily used to perform such measurements. (Leaky bucket measurements will tell how much bandwidth was carried and how much was dropped or marked as non-compliant. Thus, the amount offered is readily inferred.) In the context of packet-level measurements, we let $\omega_{s\sigma}$ represent the revenue generated by the service provider for carrying a unit amount of data on stream $(s, \sigma)$. Thus, an expression appropriate in this context for the incremental gain in revenue for window n is $$W_{s\sigma}(n) - W_{s\sigma}(n-1) = \tilde{V}_{s\sigma}^{RAW}(n)\tau\omega_{s\sigma}.$$

A penalty structure that we believe will be especially advantageous in the context of packet-level measurements is defined by prescriptions (i)–(iii), below, for the value of the incremental penalty for time window n, i.e., for penalty$_{s\sigma}$(n)–penalty$_{s\sigma}$(n–1). The prescription are made with reference to quadrants A–D of FIG. 1.

(i) If the network SLA state for stream $(s, \sigma)$ lies in quadrant A or C, the incremental penalty is zero.

(ii) If the SLA state lies in quadrant B, the incremental penalty is $$m_s\omega_{s\sigma}\tau\left[\left(\frac{V_{s\sigma}}{U_{s\sigma}}\right)\tilde{U}_{s\sigma}^{RAW}(n) - \tilde{V}_{s\sigma}^{RAW}(n)\right]^+$$

(iii) If the SLA state lies in quadrant D, the incremental penalty is $$m_s\omega_{s\sigma}\tau\left[V_{s\sigma} - \tilde{V}_{s\sigma}^{RAW}(n)\right]^+$$

The notation $[\ldots]^+$ signifies that if the bracketed quantity is less than zero, it should be set to zero.

As noted, an off-line design process is advantageously employed for allocating (in a statistical sense) the offered traffic for each stream among the admissible routes for that stream. Information passed from the design phase to the SLA-management process will generally include $U_{s\sigma}$ and $V_{s\sigma}$ as well as the designed service-route loads $X_{sr}$. We have found it advantageous to derive the loads $X_{sr}$ from the raw output of the design, which is based on mean values of traffic bandwidth, in a manner which reserves extra capacity in anticipation of traffic variability. Thus, if the design process yields a mean value $M_{sr}$ of aggregate bandwidth carried on a service route, we set the corresponding load parameter $X_{sr}$ equal to $M_{sr}$ plus an additional increment related to traffic variability. Although the standard deviation, for example, could be used as such a measure of variability, we have found that an adequate measure is provided by the square root of the mean value. Accordingly, we have found it advantageous to set $$X_{sr} = M_{sr} + \gamma\sqrt{M_{sr}},$$

where $\gamma$ is a small non-negative number, typically about 0.5. Similarly, we have found it advantageous to set $$V_{s\sigma} = M_{s\sigma} - \beta\sqrt{M_{s\sigma}},$$

where $\beta$ is another small, non-negative number, also typically about 0.5. In the preceding expression, $M_{s\sigma}$ is the mean carried aggregate bandwidth on stream $(s,\sigma)$ obtained from the design process. As $\beta$ increases, the contracted amount $V_{so}$ of carried bandwidth decreases more steeply with increasing traffic variability. Thus, increasing β is appropriate for reflecting increasing aversion by the service provider to incurring penalties for lost calls. On the other hand, increasing β also tends to reduce the flow-acceptance ratio $V_{so}/U_{so}$ contracted for in the SLA.

A penalty structure for lost calls, as described above, can optionally be included in the design process, although some additional complexity will result. In the numerical studies whose results we report below, we did not include the penalty structure in the design process.

Alternate revenue structures are also readily implemented. For example, the service provider might wish to demand a premium for carrying calls at the contracted bandwidth value when the amount of offered bandwidth exceeds the contracted value, i.e., when the network state lies in quadrant C of FIG. 1. In such a case, a second-tier revenue parameter, larger than the basic stream revenue parameter $w_{so}$, can be applied when the network state lies in quadrant C. Such a second-tier parameter can be applied, e.g., to all carried bandwidth, or it can be made to apply only to carried bandwidth in excess of the contracted amount.

In the phase of network management that we refer to as "route classification," each ingress node evaluates, for every time window n, a variable $status_{sr}(n)$ based on the bandwidth load, aggregated over calls, of each service route (s, r) from the ingress node, and it maintains a database of these variables. Each variable $status_{sr}(n)$ is computed at the beginning of time window n and remains fixed during the window. This status variable is computed for each admissible route r for each stream having the given node as its ingress node, for each corresponding egress node, and for each service class s.

Figure 3:
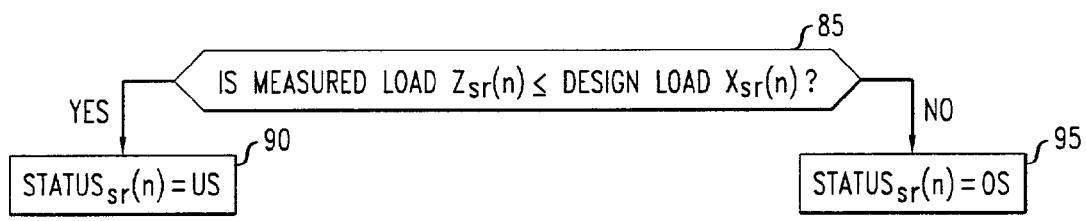
FIG. 3 is a flowchart illustrating determination of the loading status of a service route by comparting measured load with design load, according to an illustrative embodiment of the invention, in one aspect.

FIG. 3 illustrates an exemplary process for evaluating $status_{sr}(n)$. At block 85, the measured bandwidth load $Z_{sr}(n)$ on service route (s, r) at the beginning of window n is compared with the design load $X_{sr}$. As indicated at block 90, the loading status of the service route is declared "undersubscribed" (i.e., $status_{sr}(n)$ is set equal to US) if the measured load is no greater than the design load. As indicated at block 95, the loading status is declared "oversubscribed" ($status_{sr}(n)$ is set equal to OS) if the measured load is greater than the design load. The loading status of service routes is important in the implementation of the phase referred to here as "Routing and Admission Control," which is described below.

We will now describe an exemplary procedure for measuring the service-route bandwidth load $Z_{sr}(n)$ using quantities computed from local measurements at the ingress node. This measurement procedure is based on a window of length τ and on exponential smoothing with a smoothing parameter α. A similar procedure, possibly using different values of the window length and smoothing parameter, is readily applied for computing the offered and carried stream loads $\tilde{U}_{so}(n)$ and $\tilde{V}_{so}(n)$.

Let t represent a time value within the n'th window, i.e., $(n-1)\tau \leq t < n\tau$. Let $Y_{sr}(t)$ denote the aggregate bandwidth usage on service route (s, r) at time t. We note that $Y_{sr}(t)$ increments by a unit of the effective bandwidth $d_s$ with each new call, and it decrements by the same amount with each call departure.

Let $\overline{Y}_{sr}(n)$ denote the mean bandwidth usage on the service route over the n'th window, i.e., $$\overline{Y}_{sr}(n) = \frac{1}{\tau}\int_{(n-1)\tau}^{n\tau} Y_{sr}(\eta)d\eta.$$

Let $Z_{sr}(n+1)$ denote the exponentially smoothed estimate of bandwidth usage, aggregated over calls, on the service route at the start of the (n+1)'th window.

Then according to our method, $Z_{sr}(n+1)=\alpha Z_{sr}(n)+(1-\alpha)\overline{Y}_{sr}(n)$.

It should be noted in this regard that because only the ingress node will have been setting up calls on service route (s, r), without interference from other nodes (which of course may be ingress nodes as to calls for their own streams), all the necessary load information is available to it.

We now turn to a description of control algorithms for Routing and Admission Control. We note first that these algorithms apply a methodology known as Virtual Partitioning (VP). In the VP methodology, the bandwidth capacity of each link l is regarded as a resource which is an object of contention by all service routes in which link l is included. In our application of VP, those contending service routes that are undersubscribed (at a given time) are given preference over oversubscribed service routes. As explained below, a procedure referred to here as Bandwidth Protection (BP) implements this preference when new calls associated with a given stream are set up. It should be noted that at call set-up, in an exemplary implementation, the ingress node sends to each link in a service route of interest a request and an indication of the value of $status_{sr}(n)$ for the service route of interest and current time window n.

Figure 4:
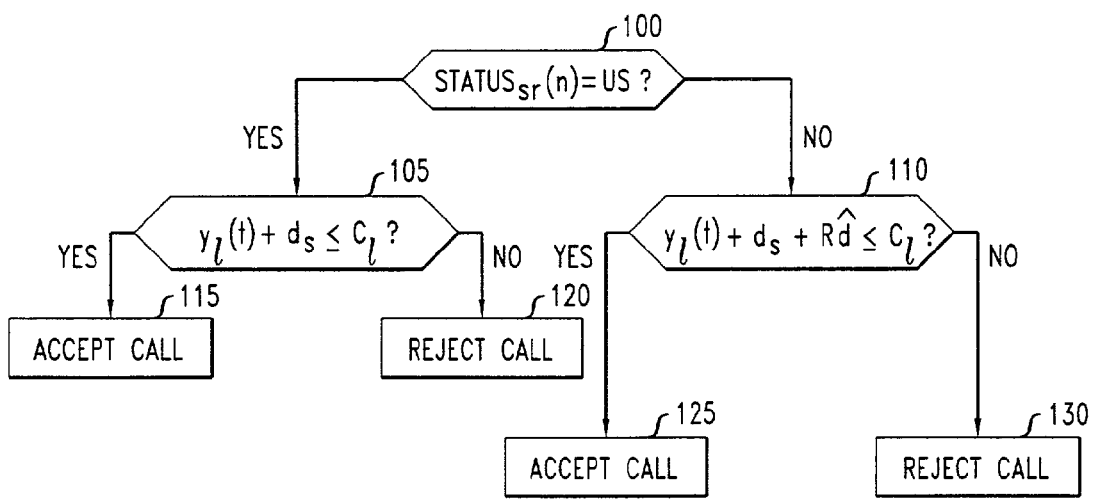
FIG. 4 is a flowchart illustrating bandwidth protection in routing decisions, according to an illustrative embodiment of the invention, in one aspect.

We now describe the Bandwidth Protection procedure with reference to FIG. 4. This procedure is advantageously performed at the ingress node. Let l represent a link traversed by the potential service route, let $C_l$ represent the bandwidth capacity of link l, and let $y_l(t)$ represent the total bandwidth usage on the link at the time t of call set-up. (Obviously, $y_l(t)$ cannot exceed $C_l$.) Let (s, r) represent a potential service route that has been selected for routing an incoming call.

At block 100 of the figure, a determination is made whether the status of the potential service route in the current window n is undersubscribed (i.e., whether $status_{sr}(n)$ equals US). If the service route is identified as undersubscribed, a further determination is made at block 105 whether there is sufficient available bandwidth on the service route to accept the call. At block 105, there will be deemed sufficient bandwidth only if at the time of call set-up, for every link l traversed by the potential service route, there is enough remaining capacity to accommodate the effective bandwidth $d_s$ of the incoming call, i.e., only if, for all l∈(s,r), $y_l(t)+d_s \leq C_l$. If this condition is satisfied, the call is accepted, as indicated at block 115. Otherwise, the call is rejected, as indicated at block 120.

With reference once again to block 100, if the service route is determined not to be undersubscribed, it is oversubscribed (i.e., $status_{sr}(n)$ equals OS). In that case, the determination whether there is sufficient available bandwidth on the service route to accept the call is made at block 110. The test applied at block 110 is more demanding than the test applied at block 105. At block 110, each link l traversed by the service route is required to have remaining capacity not only for the effective bandwidth $d_s$, but also for a quantity of bandwidth Rd, referred to here as the bandwidth reservation. That is, the call is accepted (at block 125) only if, for all $l \in (s,r)$, $y_l(t)+d_s+R\hat{d} \leq C_l$. Otherwise, the call is rejected (at block 130).

The bandwidth reservation $R\hat{d}$ forces our routing procedure to give preference to undersubscribed service routes in two respects. First, an attempt to route a call on an oversubscribed service route must satisfy a more demanding test than a routing attempt on an undersubscribed service route. Second, enforcing the bandwidth reservation assures that after successfully routing a call on an oversubscribed service route, each link along that route will still have capacity to carry a call on at least one undersubscribed service route in which such link is included. (Depending on the value of R, there may be remaining capacity to carry calls on several undersubscribed service routes.)

The bandwidth reservation described here is the product of two factors: the bandwidth protection parameter R and a quantity $\hat{d}$. The bandwidth protection parameter is an adjustable, small positive number typically in the range 1.0–2.0, and exemplarily about 1. The quantity $\hat{d}$ is, e.g., the greatest effective bandwidth over all service classes; i.e., $$\hat{d} = \max_s d_s.$$

It should be noted that an attempt to set up a call on a selected service route will succeed only if all the links in the service route accept the call after the Bandwidth Protection procedure of FIG. 4 has been implemented.

As noted, the quantity $y_l(t)$ represents the total bandwidth usage on a link l at the time t of call set-up. There are various ways for the ingress node to acquire this information concerning bandwidth usage on the links belonging to pertinent routes. One approach is for the ingress node to send out scout requests as needed, exemplarily by sending out specialized scout packets, which solicit usage information from the pertinent routers. Such an approach is effective, but it contributes a relatively large amount of signalling traffic overhead to the network, which may be disfavored in at least some cases. An alternative approach, sometimes referred to as "periodic flooding," is for the ingress node to broadcast periodic requests to the network, for usage information. This approach adds less traffic overhead than the use of scout packets, but late in the broadcast cycle, before the next request, the ingress node is generally forced to use outdated information.

Yet a third approach, which we believe will be advantageous in at least some cases, applies usage information that the ingress node has acquired through previous call set-up requests. The advantage of this approach is that it adds little or no signaling traffic overhead, and for at least some routes is as current as the most recent routing attempt. The use of previous call set-up attempts to acquire link usage information is discussed, e.g., in the co-pending U.S. patent application Ser. No. 08/565,737, filed on Nov. 30, 1995 by R. Gawlick et al. under the title, "A Method Of Admission Control And Routing Of Virtual Circuits," and commonly assigned herewith.

Figure 5:
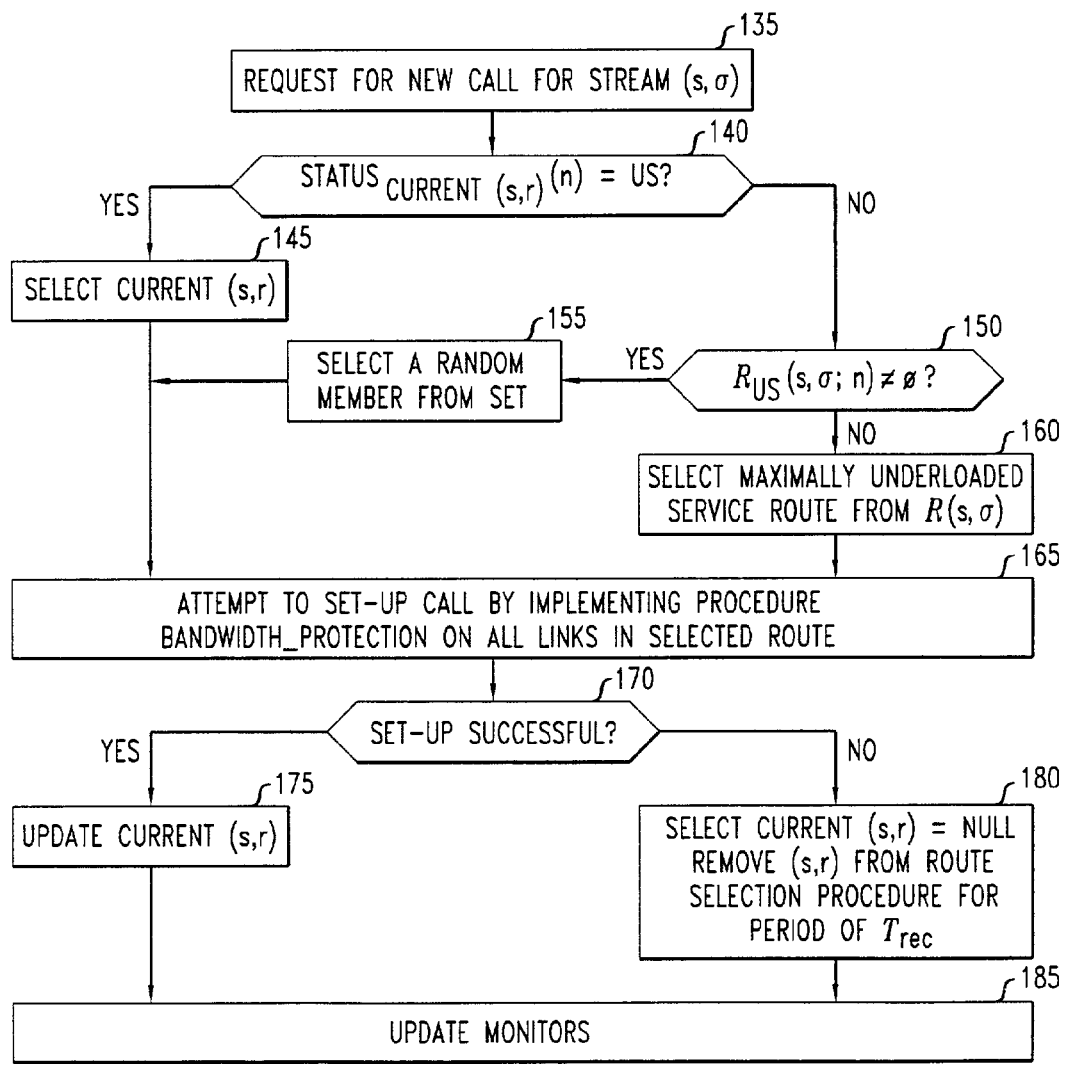
FIG. 5 is a flowchart illustrating the handling of a request for a new call for a given stream according to the invention in one embodiment. Included in the procedure of FIG. 5 is the bandwidth protection procedure of FIG. 4.

Turning now to FIG. 5, there is represented at block 135 a request to route a new call for stream $(s,\sigma)$. Blocks 140 and 145 represent an attempt to route the call according to a procedure known as sticky routing. Sticky routing is described, e.g., in R. J. Gibbens et al., "Dynamic alternative routing—modeling and behavior," *Proc. 12th Int. Teletraffic Congress*, Torino, 3.4A.3.1–3.4A.3.7 (1988).

The ingress node has the option of attempting to route the new call on any admissible route for the pertinent stream. According to the sticky routing procedure, the preference is to use the last service route on which a call for the same stream was successfully routed. In our exemplary procedure of FIG. 5, however, such a last service route (denoted in block 140 as "current(s, r)") may be selected only if it is undersubscribed in the current time window n. Thus, if the test for undersubscribed status of block 140 is satisfied, the service route current(s, r) is selected for the routing attempt as indicated at block 145.

If the test of block 140 is not satisfied, then as indicated at block 150, a determination is made whether, in the current time window, there is any service route in the admissible route set $R(s,\sigma)$ that is undersubscribed. If there is at least one such service route, a set $R_{US}(s,\sigma;n)$ of the admissible service routes at time window n is defined, and as indicated at block 155, a member of that set, exemplarily a randomly chosen member, is selected for the routing attempt.

If at block 150 no admissible undersubscribed service routes are found, then, as indicated at block 160, a preferred one of the available oversubscribed service routes is selected. The preferred oversubscribed service route is the one that is determined to be maximally underloaded. In this context, the amount of underloading is the amount by which the design load $X_{sr}$ exceeds the aggregate bandwidth usage $Y_{sr}(t)$ on a service route at time t. Thus, the maximally underloaded route is the route of the admissible route set that minimizes the quantity $Y_{sr}(t)-X_{sr}$. It should be noted that the determination of a maximally underloaded route is readily determined at the ingress node, since the ingress node has possession of the values of $Y_{sr}(t)$ and $X_{sr}$.

Once a service route has been selected, the attempt to set the call up on the selected route is made at block 165, where the Bandwidth Protection procedure of FIG. 5 is implemented. A determination is made at block 170 whether the routing attempt was successful. If so, then in accordance with sticky routing, if used, the register containing the last successful service route current(s, r) is updated, as indicated at block 175. If the test at block 170 indicates an unsuccessful attempt, then the call may be lost or, alternatively, a new attempt may be made to route the call according to a procedure, described below, that we refer to as crankback.

If sticky routing is being applied, then if the test at block 170 indicates an unsuccessful routing attempt, current(s, r) is set to a null value, as indicated at block 180.

When an attempt to set up a call on a selected service route has failed, the likelihood that the service route can accept another call set-up request will be small initially, but will increase with time. Accordingly, it will generally be advantageous to remove the selected service route from consideration for a period of time $T_{rec}$, which we refer to as the recovery time. The removal of such a route from the route selection procedure for a period $T_{rec}$ is indicated in FIG. 5 at block 180.

As indicated at block 185, monitor data are updated with the results of the call set-up attempt of blocks 135–180. By "monitor data" is meant information to be used in status decisions, revenue and penalty calculations, and the like. Such information includes, e.g., entries in databases at the ingress node that keep track of the number of calls carried and blocked, the carried and blocked bandwidth, and the like.

As noted, if the call set-up attempt has failed, a new set-up attempt may be made by applying a crankback procedure. According to an exemplary crankback procedure, after block 185, the procedure of blocks 140–185 is repeated until the new call has been routed, or until the set-up request has failed a specified number of times. In at least some cases, it may be advantageous to apply crankback only if certain conditions are satisfied. For example, in one form of selective crankback, a new set-up attempt is made only if loss of the call would cause the service provider to incur a penalty, i.e., only if the service provider is currently SLA-non-compliant with respect to the relevant stream.

We have noted, above, that information passed from the off-line design phase to the SLA management process will generally include the design value $U_{so}$ of offered stream bandwidth, the design value $V_{so}$ of carried stream bandwidth, and the mean values $M_{sr}$ of aggregate bandwidth carried on the respective service routes corresponding to each stream. From the values $M_{sr}$, as noted, we obtain designed service-route loads $X_{sr}$.

We have also noted, above, that a VPN is defined when the SLA specifies the amount of bandwidth that is to be made available, on demand, in each of a set of streams identified by the customer. The concept of SLA compliance described above in regard to offered and carried stream bandwidth is readily extended to address compliance issues where a VPN has been specified. That is, where previously the tests of blocks 10 and 15 of FIG. 1 were applied to quantities $V_{so}$, $U_o$, $\tilde{V}_{so}(n)$, $\tilde{U}_{so}(n)$ specific to a given stream (s, σ), the same tests are now applied to analogous quantities $V_{s,o}^{(v)}$, $U_{s,o}^{(v)}$, $\tilde{V}_{s,o}^{(v)}(n)$, $\tilde{U}_{s,o}^{(v)}(n)$, which are specific to a given sub-stream (s,σ;v) which belongs to a particular VPN having the index v. We refer to such a sub-stream as a "VPN stream."

Thus, a revenue and penalty structure as discussed above in connection with FIG. 2 is readily devised to govern the net revenue that the service provider can collect from a customer by virtue of operating a VPN for the customer.

One or more VPNs may be specified as input to the off-line design phase. In such a case, service-route loads $X^{s;(v)}$ that are analogous to the earlier-mentioned loads $X_{sr}$ but are specific to the traffic of particular VPNs v, are obtainable, directly or after modification, from the design-phase output. We refer to the loads $X_{sr}^{(v)}$ as "VPN service-route design loads."

We have noted, above, that various service routes (both for the same stream and for different streams) contend for limited bandwidth capacity on those links that are shared among the sevice routes. If too much traffic is routed through a given link, a network roadblock can result. Our Bandwidth Protection procedure helps to prevent such roadblocks by reserving link bandwidth on oversubscribed service routes that can be made available to undersubscribed service routes intersecting the same links.

When VPNs are introduced, additional forms of contention appear. For example, different VPNs may now contend for the same link bandwidth, and within a single VPN, different streams as well as different routes belonging to the same stream may contend for the same link bandwidth. These forms of contention are readily dealt with by a simple extension of the Bandwidth Protection procedure of FIG. 4. The earlier concept is extended by defining a new variable $status_{sr}^{(v)}(n)$, which is analogous to the above-defined variable $status_{sr}(n)$, but is specific to a service route belonging to VPN v. A VPN service route (s,r;v) is declared undersubscribed, and $status_{sr}^{(v)}(n)$ is set equal to US, if the measured load $Z_{sr}^{(v)}(n)$ on VPN service route (s,r;v) in time window n is no greater than the design load $X_{sr}^{(v)}$. Otherwise, the VPN service route is declared oversubscribed, and $status_{sr}^{(v)}(n)$ is set equal to OS.

As in the procedure of FIG. 4, a bandwidth reservation $R_1\partial$ is imposed if a call is routed on an oversubscribed VPN service route.

Within a given VPN, there also may be contention between the various classes of service associated with that VPN. That is, it will often be the case that the owner of a VPN is less concerned with the call acceptance rate for a particular class of service than he is with the cumulative acceptance rate of calls of all classes. Such a VPN owner will wish to prevent calls of a particular service class to dominate the network resources and crowd out calls of other classes. In such an environment, it is useful to characterize a given VPN source-destination pair as oversubscribed if it is getting more than its designed share of traffic. A new call, of any service class, will be routed between an oversubscribed pair only if a bandwidth reservation $R_2^{(v)}\partial$ is imposed on the resulting VPN service route.

As a general rule, the bandwidth reservation parameter $R_1$ will be common to all VPNs on the network, whereas the bandwidth reservation parameter $R_2^{(v)}$ will be separately negotiated for each VPN. Generally, $R_2^{(v)}$ will be at least as great as $R_1$.

The preceding concepts are described in further detail with reference to FIG. 6. In box 190, the variable $status_{sr}^{(v)}(n)$ takes on the value US or OS, as explained above. A further variable $status_o^{(v)}(n)$ is introduced in box 195. This further variable is defined with reference to a VPN design load $X_o^{(v)}$ obtained by summing the load variables $X_{sr}^{(v)}$ over all service classes and all admissible routes. That is, $$X_\sigma^{(v)} = \sum_s \sum_{r \in R^{(v)}(s,\sigma)} X_{sr}^{(v)},$$

where $R^{(v)}(s,\sigma)$ is the admissible route set for VPN stream (s,σ;v). The design load $X_o^{(v)}$ is compared with a measured load $Z_o^{(v)}(n)$ equal to the carried bandwidth in time window n for VPN streams (s,σ;v), summed over all service classes. If $Z_o^{(v)}(n)$ is no greater than $X_o^{(v)}$, the variable $status_o^{(v)}(n)$ is set equal to US. Otherwise, it is set equal to OS.

Quadrant A of the figure represents the state in which both $status_{sr}^{(v)}(n)$ and $status_o^{(v)}(n)$ are equal to US. In that case, an incoming call is accepted for routing on the proposed service route without imposing a bandwidth reservation.

Quadrant B of the figure represents the state in which $status_{sr}^{(v)}(n)$ is OS, but $status_o^{(v)}(n)$ is US. In that case, the call is accepted only if a bandwidth reservation $R_1\partial$ is available.

Quadrant C of the figure represents the state in which $status_{sr}^{(v)}(n)$ is US, but $status_o^{(v)}(n)$ is OS. In that case, the call is accepted only if a bandwidth reservation $R_2^{(v)}\partial$ is available.

Quadrant D of the figure represents the state in which $status_{sr}^{(v)}(n)$ and $status_o^{(v)}(n)$ are both OS. In that case, the call is accepted only if both of the bandwidth reservations described above are available, i.e., only if a total bandwidth reservation $(R_1+R_2^{(v)})\partial$ is available.

Those skilled in the art will appreciate from the preceding discussion that VPN traffic can be studied at various levels of aggregation. At a low level of aggregation, traffic can be studied at the level of VPN service routes, identified by the triplet of indices (s,r;v). (It is understood that all the routes r referred to correspond to some given source-destination pair σ consisting of a source, i.e., ingress, node $\sigma_1$ and a destination, i.e., egress, node $\sigma_2$.) At a higher level, traffic is aggregated over all routes corresponding to a given stream. This defines the VPN stream level, identified by the triplet of indices (s,σ;v).

At a still higher level, VPN stream traffic is aggregated over all service classes. This defines the VPN pipe level, identified by the pair of indices (σ;v). It will be appreciated that the variable $status_\sigma^{(v)}(n)$, defined above, refers to traffic loading at the VPN pipe level.

At yet a higher level, VPN pipe traffic is aggregated over different source-destination pairs σ sharing a common ingress node $\sigma_1$. In other words, all VPN pipe traffic from a given ingress node is aggregated together. This defines the VPN hose level, identified by the pair of indices ($\sigma_1$;v).

The method described above with reference to FIG. 6 is designed to regulate the sharing of bandwidth by VPN service-routes and VPN pipes. In at least some cases, it will be advantageous to apply the method of FIG. 6 at a higher or lower level of aggregation than the VPN pipe level. That is, a variable analogous to $status_\sigma^{(v)}(n)$ is readily devised at the VPN stream level or the VPN hose level, and applied in the method of FIG. 6 in substitution for $status_\sigma^{(v)}(n)$.

EXAMPLE

Figures 6, 7:
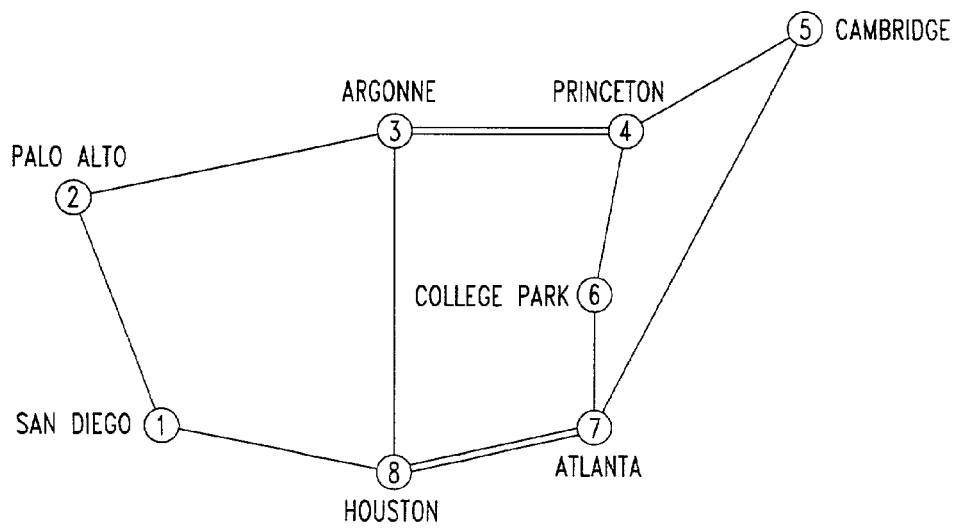
FIG. 6 is a chart illustrating an exemplary form of bandwidth protection that may apply when VPNs are supported by the network.
FIG. 7 is a schematic diagram of a fictitious communication network used as the basis for numerical studies described in the Example section, below.

We performed a numerical case study based on a fictitious network which has eight nodes (N=8), of which 10 pairs are directly connected, as shown in FIG. 7. The network has 20 directed links (L=20), one in each direction for each connected node pair. The typical bandwidth of a directed link is OC3=155 Mbps, with the exception of the links connecting Argonne (3) and Princeton (4), and also Houston (8) and Atlanta (7), which have bandwidths of 2×OC3=310 Mbps. One measure of total resources in the network is 24 OC3-hops.

There are six service classes: voice, data 1, data 2, data 3, data 4, and video, indexed by s=1, 2, ..., 6, respectively. The effective bandwidths of individual flows of these classes are $d_s$=16, 48, 64, 96, 384 and 640 Kbps. Voice (s=1) and video (s=6) are delay sensitive service classes, and their admissible route sets R (s, σ) consist only of routes with the minimum number of hops. There are a total of 68 routes for each of these two service classes. The four remaining are data service classes, all delay insensitive. Their admissible route sets R (s, σ), s=2, 3, 4, 5, are identical and consist of routes with at most four hops. For each such s there is a total of 160 routes.

The mean durations or holding times, $h_s$, of flows of the service classes are as follows: $h_s$=1, 1, 1, 4, 4, 6.67, where the unit of time is 3 minutes. Thus video flows last on average for 20 minutes.

We next describe the aggregate bandwidths $U_{s_\sigma}$ offered to streams (s, σ), that are also stipulated in the SLA and used in the design. We define the matrices $U_s=\{U_{s\sigma}\}$, s=1, 2, ..., 6, and, furthermore, for compactness we define a single base matrix U from which we obtain $U_s=k_sU$, where $k_s$ is a scalar multiplier. The multipliers are $k_s$=0.39, 0.14, 0.12, 0.14, 0.11, 0.10. The total offered traffic for the real time services (s=1 and 6) are approximately balanced by that for data services. Table I gives the matrix U.

The conversion from carried flows to revenue is calculated on the basis that 16 Kbps bandwidth carried for a unit of time generates unit revenue.

The design for the case study was done by the techniques described in D. Mitra et al., "ATM network design and optimization: A multirate loss network framework,"*IEEE/ACM Trans. Networking* 4 531–543 (1996). The design gives the flow acceptance ratios for individual streams that exceed 0.99.

We considered three scenarios, each with a distinctive traffic pattern that is characterized by the set of actual offered aggregate traffic for all streams (s, σ), i.e. for all service classes and ingress-egress node pairs. The traffic patterns are:
  (i) NORMAL: The ideal case where the offered traffic $U_{(s,\sigma)}$ is identical to the stipulated quantities in the SLA and Design.
  (ii) BALANCED ABNORMAL: Half the node pairs, which are selected arbitrarily, have no offered traffic at all, while the other half have offered traffic for each of the service classes which are twice the SLA/Design values.
  (iii) UNBALANCED ABNORMAL: 25% of all node pairs, which are selected arbitrarily, have actual offered traffic for each of the service classes which are twice as much as their respective values in the SLA/Design, while for the remaining 75% the actual offered traffic is as expected.

The lifetimes or holding times of the flows are assumed to be exponentially distributed.

Whereas net revenue, W_net( ... ), and penalty( ... ) have been defined above to be cumulative, the results presented in this section are for unit time, i.e., obtained from the cumulative quantities by dividing by the length of the simulated time.

The sample path (time and profile of every flow request) was identically reproduced for all the trials in a given scenario. For every trial, 10 million flows are simulated. The statistics reported here are based on results collected after a transient period chosen to be sufficiently large for steady state to be reached. The number of flows that contribute to the statistics is sufficiently large to make the confidence intervals negligibly small.

The parameters of interest in this study are β, the compensation parameter in the Design/SLA interface; α and τ, the exponential smoothing parameter and window length in the measurement process, and, importantly, R, the bandwidth protection parameter.

The measurement parameters have been chosen empirically. A larger α implies greater smoothing, just as a larger window length does. Increasing either one improves the quality of the measurement but at the cost of a slower response to significant traffic fluctuations. In our studies, we have found that a satisfying compromise is to set τ equal to unity, the order of the average holding time, and to have α of 0.8. Also, for the results reported here we have taken the smoothing parameter and window length in the SLA monitoring process to be the same as above.

Effect of the Bandwidth Protection. The effect of the bandwidth protection on the net revenue is indicated in Tables II, III and IV for normal, balanced abnormal and unbalanced abnormal scenarios, respectively. For these studies, we fixed the parameters γ and β to 0.5. Here we do not apply the selective crankbacks and recovery-time mechanisms.

For normal traffic conditions, the effect of the bandwidth protection and the penalty multiplier on the net revenue was found to be small. This is expected because the routing algorithm is optimized specifically for this traffic condition so as to maximize the revenue, and also the SLA has been crafted so that the actual carried bandwidth is very close to the offered bandwidth, indicating a small loss ratio. As a consequence, the penalty is insignificant in comparison to the total generated revenue. Moreover, the generated total revenue decreases slightly as we increase the bandwidth protection. This behavior indicates that bandwidth protection is being applied even in the normal condition because of the bursty nature of the offered traffic.

Turning next to the balanced abnormal traffic pattern, for the first time we observe a noticeable gap between the offered bandwidth and the actual carried bandwidth, even though the total offered bandwidth is close to normal. Now most important is the effect of the bandwidth protection; while the protection does not induce a dramatic loss in terms of total generated revenue, the penalty is reduced by one order of magnitude when one unit of bandwidth protection is applied and by another half when two units of bandwidth protection are applied. In the case of unbalanced abnormal traffic, this behavior is accentuated, and in both scenarios we see that a small protection is surprisingly beneficial and sufficient. Depending on the penalty multiplier used, our results indicate that here, an optimal value for the bandwidth protection parameter is either 1 or 2.

Effect of Compensation Parameter in Design-SLA Interface. Table V illustrates the effect of varying $\beta$ for the three scenarios when the bandwidth protection parameter R=1, the other parameters being the same as above.

TABLE I

Base Matrix U, in Mbps

| — | 14.1 | 16.5 | 2.4 | 21.2 | 11.8 | 4.7 | 7.1 |
|---|---|---|---|---|---|---|---|
| 16.5 | — | 56.6 | 7.1 | 73.1 | 35.4 | 14.1 | 21.2 |
| 18.9 | 58.9 | — | 9.4 | 87.2 | 42.4 | 16.6 | 25.9 |
| 2.4 | 7.1 | 7.1 | — | 9.4 | 4.7 | 2.4 | 2.4 |
| 18.9 | 70.7 | 84.9 | 9.4 | — | 54.2 | 18.7 | 30.7 |
| 11.8 | 33.0 | 37.7 | 4.7 | 49.5 | — | 9.4 | 14.1 |
| 4.7 | 11.8 | 14.1 | 2.4 | 18.9 | 9.4 | — | 4.7 |
| 7.1 | 18.9 | 23.4 | 2.4 | 28.3 | 14.1 | 4.7 | — |

TABLE II

NORMAL Traffic Scenario

| R, Bandwth Prtctn | Revenue Per unit time ($\times 10^4$) | Penalty Per unit time $M_s = 1$ ($\times 10^4$) | Net Revenue per unit time ($\times 10^4$) | | |
|---|---|---|---|---|---|
| | | | $m_s = 1$ | $m_s = 5$ | $m_s = 10$ |
| 0 | 7.46024 | 0.00775 | 7.452 | 7.421 | 7.383 |
| 1 | 7.45086 | 0.00585 | 7.445 | 7.422 | 7.392 |
| 2 | 7.44299 | 0.00616 | 7.437 | 7.412 | 7.381 |
| 3 | 7.34379 | 0.00656 | 7.428 | 7.402 | 7.369 |

TABLE III

BALANCED ABNORMAL Traffic Scenario

| R, Bandwth Prtctn | Revenue Per unit time ($\times 10^4$) | Penalty Per unit time $M_s = 1$ ($\times 10^4$) | Net Revenue per unit time ($\times 10^4$) | | |
|---|---|---|---|---|---|
| | | | $m_s = 1$ | $m_s = 5$ | $m_s = 10$ |
| 0 | 6.97299 | 0.21680 | 6.756 | 5.889 | 4.805 |
| 1 | 6.87995 | 0.01519 | 6.865 | 6.804 | 6.728 |
| 2 | 6.87025 | 0.00248 | 6.868 | 6.858 | 6.845 |
| 3 | 6.86073 | 0.00486 | 6.856 | 6.836 | 6.812 |

TABLE IV

UNBALANCED ABNORMAL Traffic Scenario

| R, Bandwth Prtctn | Revenue Per unit time ($\times 10^4$) | Penalty Per unit time $M_s = 1$ ($\times 10^4$) | Net Revenue per unit time ($\times 10^4$) | | |
|---|---|---|---|---|---|
| | | | $m_s = 1$ | $m_s = 5$ | $m_s = 10$ |
| 0 | 8.43146 | 0.65547 | 7.776 | 5.154 | 1.877 |
| 1 | 8.28662 | 0.09143 | 8.195 | 7.829 | 7.372 |
| 2 | 8.22821 | 0.03907 | 8.189 | 8.033 | 7.838 |
| 3 | 8.19727 | 0.04961 | 8.148 | 7.949 | 7.701 |

TABLE V

Effect of $\beta$ For Each Traffic Scenario

| Traffic Scenario | $\beta$ | Revenue ($\times 10_4$) | Penalty $M_s = 1$ ($\times 10^4$) |
|---|---|---|---|
| Normal | 0.0 | 7.44299 | 0.00924 |
| | 0.5 | 7.44299 | 0.00616 |
| Balanced Abnormal | 0.0 | 6.87025 | 0.00710 |
| | 0.5 | 6.87025 | 0.00248 |
| Unbalanced Abnormal | 0.0 | 8.22821 | 0.07051 |
| | 0.5 | 8.22821 | 0.03907 |

What is claimed is:

1. A method for controlling a disposition of an incoming call to a packetized communication network comprising nodes interconnected by links and supporting one or more service classes, wherein each pair of said nodes of the network consists of a source node and a destination node; each service class of said service classes has a respective set of permissible routes through the network from the source node to the destination node, said respective set of permissible routes to be referred to as service routes; and a respective loading value, to be referred to as a design load, is associated with each of said service routes, the method comprising:

measuring loads on at least one of said service routes, wherein said measuring comprises increasing a cumulative bandwidth measure as calls in a pertinent service class are admitted to said at least one of said service routes and decreasing said measure as said calls depart from said at least one of said service routes;

assigning a loading status of oversubscribed or undersubscribed to said at least one of said service routes, wherein said assigning comprises comparing the measured load of said least one of said service routes to a design load of said at least one of said service routes;

obtaining the loading status of said at least one of said service routes;

selecting a potential service route from said at least one of said service routes for the incoming call;

applying a test of whether each of two or more links along said potential service route has sufficient available bandwidth capacity to carry the incoming call;

if the loading status of said potential service route is undersubscribed, and if said each of two or more links along said potential service route is determined to satisfy said test, accepting the incoming call for routing on said potential service route; and if the loading status of said potential service route is oversubscribed, accepting the incoming call for routing on said potential service route only if said potential service route satisfies said test for routing the incoming call and further has sufficient available capacity not only for the incoming call, but also for a bandwidth reservation.

* * * * *